Oct. 4, 1966    H. O. ENGSTROM    3,276,309
BLIND RIVET
Filed April 15, 1964    2 Sheets-Sheet 1
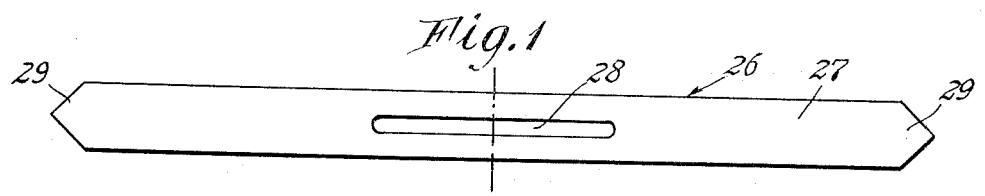
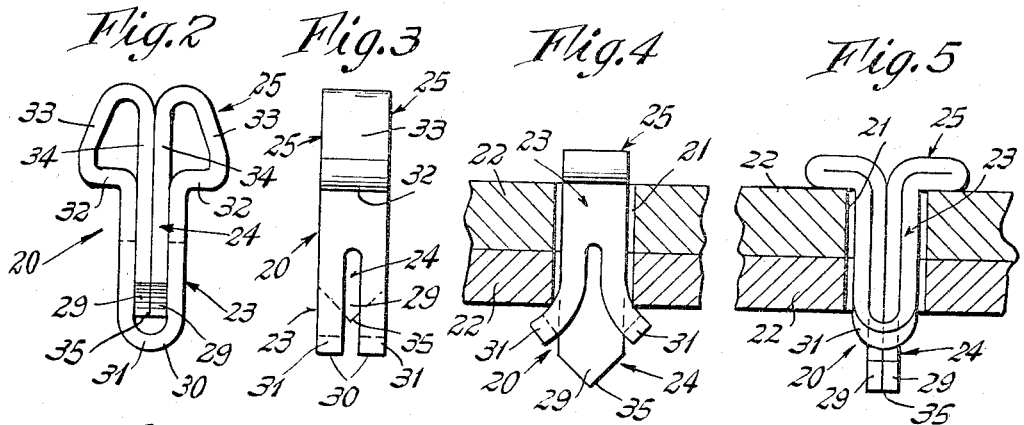
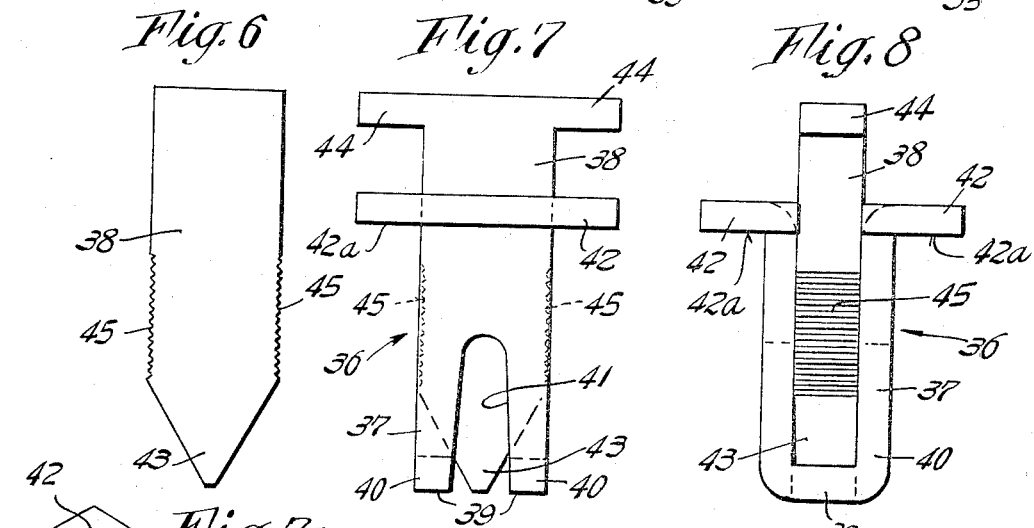
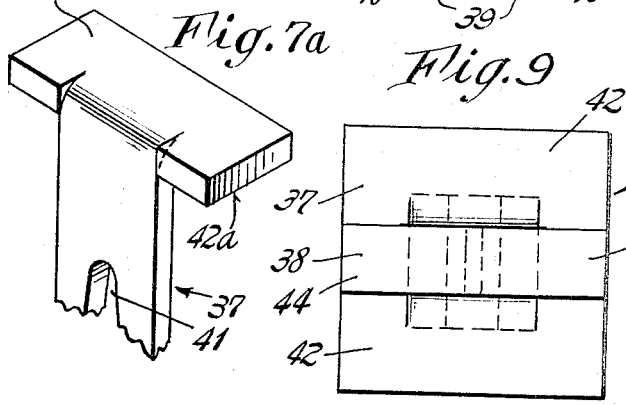
INVENTOR.
Henry O. Engstrom
BY
Johnson and Kline
ATTORNEYS Oct. 4, 1966　　　　　H. O. ENGSTROM　　　　　3,276,309
BLIND RIVET
Filed April 15, 1964　　　　　　　　　　　　　　2 Sheets-Sheet 2
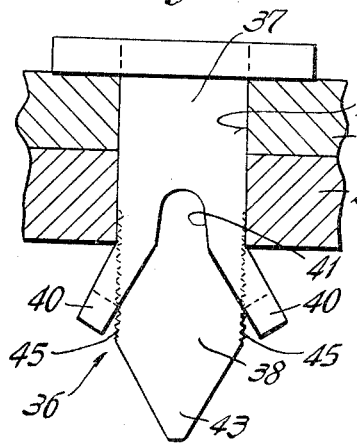
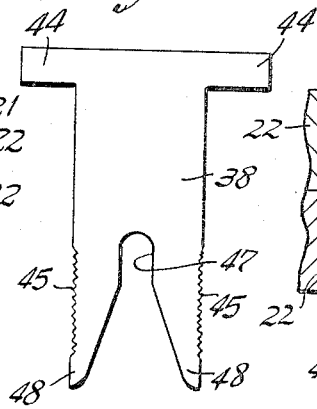
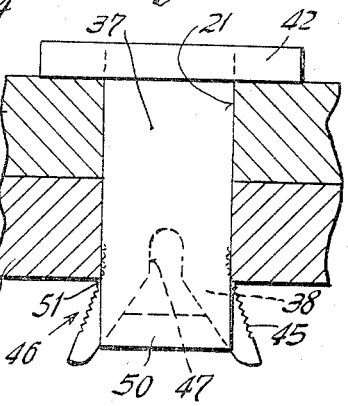
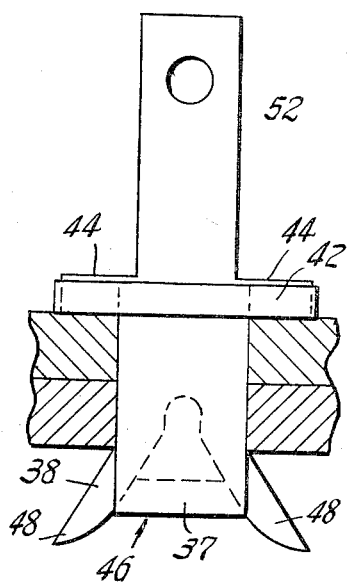
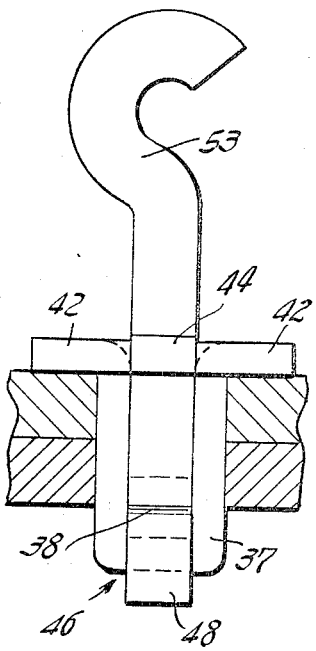
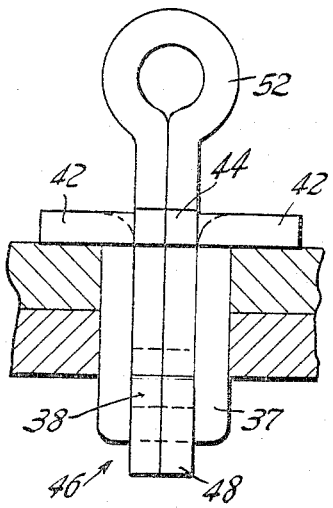
INVENTOR.
Henry O. Engstrom
BY
Johnson and Kline
ATTORNEYS United States Patent Office 3,276,309
Patented Oct. 4, 1966

3,276,309
BLIND RIVET
Henry O. Engstrom, 6 Selleck Place, New Canaan, Conn.
Filed Apr. 15, 1964, Ser. No. 359,905
3 Claims. (Cl. 85—85)

This invention relates to fasteners or rivets for securing two or more members together. More specifically, it pertains to bind rivets that can be securely set in a hole, only one end of which is accessible for setting the rivet.

It is an object of the invention to provide a blind rivet of malleable sheet material which may be easily inserted in an aperture in a panel or the like and is thereafter readily operated to clamp the opposite surfaces of the panel for securing the rivet therein.

It is also an object of the invention to provide a sheet metal blind rivet having a substantially rigid leading end for insertion through an aperture, whereby such insertion is facilitated.

It is also an object of the invention to provide a sheet metal blind rivet for insertion through an aperture in a panel, which has its inner end expanded by the application of a positive force thereon for securing the rivet in place.

Another object of the invention is to provide a sheet metal blind rivet for insertion through a hole in a panel, which is adapted to have its inner end distorted by the application of a positive force thereon for clamping the opposite surfaces of the panel between such inner end and the head of the rivet, the rivet including means for preventing accidental displacement of the rivet and rivet components from clamping position.

Another object of the invention is to provide a two part sheet metal headed blind rivet for insertion through a hole in a panel, such rivet including a stationary portion for insertion through the hole and a movable portion longitudinally movable relative to the stationary portion, one of the portions being a female portion having distortable spaced elements on the inner end thereof and the other portion being a male portion having means for engaging between and forcibly spreading the distortable elements into engagement with the underside of the panel when the stationary and movable portions are relatively moved.

Still another object of the invention is to provide a two part sheet metal headed blind rivet for insertion through a hole in a panel, such rivet including a stationary U-shaped sleeve portion for insertion through the hole and a movable portion longitudinally movable in the sleeve, one of the portions being a female portion having distortable spaced elements on the inner end thereof and the other portion being a male portion having means for engaging between and forcibly spreading the distortable elements into engagement with the underside of the panel when the movable portion is longitudinally moved in the sleeve portion.

Yet another object of the invention is to provide a unitary sheet metal blind rivet formed from an elongate blank folded to provide a first portion in the form of a U-shaped sleeve for insertion in a hole in panel, means for limiting insertion of the sleeve in the hole, and a second portion extending into and longitudinally movable within the sleeve, one of the portions being a female portion having distortable spaced elements on the inner end thereof and the other portion being a male portion having means for engaging between and forcibly spreading the distortable elements into engagement with the underside of the panel when the second portion is longitudinally moved in the first portion.

It is further an object of the invention to provide a unitary sheet metal blind rivet formed from an elongate blank having a longitudinal medial slot therein, the blank being folded back upon itself around an imaginary transverse centerline extending through the slot for forming a U-shaped sleeve for insertion through a hole in a panel, the blank being thereafter folded to form a head for limiting insertion of the sleeve in the hole and to provide a spreading member extending into and longitudinally movable within the sleeve, the slot in the base of the sleeve defining space elements adapted to be forcibly spread into engagement with the underside of the panel by movement of the spreading member into engagement therebetween.

It is still further an object of the invention to provide a sheet metal blind rivet which is readily formed on conventional blanking, shaping or bending machines and is of extremely rugged character with exceptional holding strength.

Other objects and advantages will be apparent from the specification and claims when considered in connection with the attached sheets of drawings, illustrating one form of the invention, wherein like characters represent like parts and in which:

FIGURE 1 is a plan view of a blank for use in making one form of blind rivet according to the invention;

FIGURE 2 is an elevational view of the blind rivet formed from the blank of FIG. 1;

FIG. 3 is a side elevational view of the blind rivet of FIG. 2;

FIGS. 4 and 5 are views, partially in section, of the blind rivet of FIGS. 2 and 3 in secured position in an aperture in a panel;

FIG. 6 is a plan view of a male spreading member for another form of blind rivet, according to the invention;

FIG. 7 is an elevational view of another form of blind rivet, utilizing a spreading member substantially similar to the member of FIG. 6;

FIG. 7a is a fragmentary perspective view of the female member of the blind rivet of FIG. 7 showing an insertion limiting shoulder thereof;

FIG. 8 is a side elevational view of the blind rivet of FIG. 7;

FIG. 9 is a top view of the blind rivet of FIG. 7;

FIG. 10 is a view, partially in section, of the blind rivet of FIG. 7 in secured position in a hole in a panel;

FIG. 11 is a plan view of the female member of another form of blind rivet, according to the invention;

FIG. 12 is a view, partially in section, of a blind rivet, utilizing the female member of FIG. 11, in secured position in an aperture in a panel; and FIGS. 13 to 15 are views, partially in section of different embodiments of the blind rivet shown in FIG. 12.

Referring now to the drawings for a detailed description of the invention, in FIGS. 1 to 5 one form of blind rivet 20, according to the invention, is shown. The blind rivets with which this invention is concerned are of the type adapted to be inserted, for instance, in an aperture 21, as shown in FIGS. 4 and 5, for securing two or more members 22 together, the rivet being accessible from only one side of the members for seating and securing it in position.

The blind rivet 20, which includes a stationary portion 23, a movable portion 24 and an insertion limiting head 25 is a unitary device formed from the sheet metal or similar malleable blank 26 shown in FIG. 1. The blank, which is in the form of an elongate strip 27, is provided with a longitudinally extending medial slot 28 and is tapered or pointed at its opposite ends, as shown at 29. The strip 27, which is readily shaped to form the rivet 20 by means of conventional blanking, shaping or bending equipment, is folded around an imaginary transverse centerline passing through the slot 28, as indicated by the broken line in FIG. 1, to form the stationary portion 23 of the rivet. The stationary portion of the rivet, which is in the form of a substantially U-shaped sleeve and is adapted to be inserted and seated in the hole 21, has its leading end 30 defined by the base of the U-shaped sleeve, thus providing a substantially rigid self-supporting end to facilitate insertion.

In the form of the invention illustrated in FIGS. 1 to 5, the stationary portion 23 of the rivet 20 is a female portion having integral depending spaced elements 31, defined, at its leading end 30, by the slot 28, which are adapted to be forcibly spread, as will be hereinafter explained, into clamping engagement with the underside of one of the clamped or secured members 22.

The free ends of the strip 27, or the formed U-shaped sleeve, are bent outwardly in opposite direction to extend substantially normal to the longitudinal centerline of the sleeve, as shown at 32, for providing a shoulder or abutment for limiting insertion of the sleeve through the hole 21 and are then bent inwardly and upwardly toward each other, as shown at 33, to complete the head 25 of the rivet. Finally, the free ends are folded inwardly and substantially back upon themselves, as shown at 34, to extend in juxtaposed relation into the cavity of the U-shaped sleeves to form the movable portion 24 of the rivet. The movable portion of the rivet, which has its leading end 35 defined by the ends 29 of strip 27 and is longitudinally movable in the sleeve toward the leading end 30 thereof, on the application of force to the head 25, is normally spaced from the leading end of the sleeve in the unsecured condition of the rivet.

The blind rivet 20, as is particularly shown in FIGS. 4 and 5, is adapted to be inserted through an aperture 21 in a panel or similar member 22 for securing a plurality of members together. In use, the rivet is inserted through the aperture 21 so that the shoulder 32 of head 25 abuts a surface of one of the members to be secured and the leading end 30 of the sleeve projects beyond the opposite surface of the other member. Thereafter, pressure is applied to the head 25 in the direction of the sleeve or stationary portion of the rivet for moving the movable portion of the rivet inwardly so that its leading end 35 engages between spaced elements 31 for forcibly spreading them into engagement with the surface of the member beyond which they etxend.

It should here be noted that the unitary blind rivet 20, above described, may be modified within the concepts of the invention so as to provide a movable female portion and a stationary male portion or to provide locking means, in the form of serrations, as will be discussed in connection with the forms of the invention shown in FIGS. 6 to 10 and 11 to 12, for preventing accidental displacement of the rivet from secured position.

Referring now to FIGS. 6 through 10, the invention is shown embodied in a blind rivet 36. The blind rivet 36, which is of two part sheet metal or similar malleable construction, includes a stationary portion 37, in the form of a substantially U-shaped sleeve for insertion in an aperture 21 in a member 22 or the like, and a movable portion 38, adapted to be longitudinally movably received in the sleeve. In this form of the invention, the stationary portion or sleeve 37 comprises the female portion of the rivet and includes, at its leading end 39, depending spaced elements 40 defined by the slot 41, provided in such leading end. It will be apparent that the U-shaped sleeve 37 may be readily formed from a flat blank, having the medial longitudinal slot 41 therein, by folding the blank around an imaginary transverse centerline passing through the slot, substantially as was described in connection with the blind rivet of FIGS. 1 through 5. While the head or insertion limiting portion of the rivet 36 may take any form that will serve the desired purpose, in the illustrated form of the invention the blank for forming the U-shaped sleeve has been provided at its opposite ends with enlarged lips 42 (see FIG. 7a) which are folded to extend normal to the sleeve for providing shoulders 42a to abut the surface of a connected member 22, thus limiting insertion of the sleeve in aperture 21.

It should here be noted that, while the leading end 39 of the stationary or female portion 37 is slotted to provide the deformable elements 40, prior to the application of a deforming force thereagainst it provides a substantially rigid self-supporting construction facilitating insertion through the aperture.

The movable portion 38 of the blind rivet 36, as illustrated, comprises the male portion and is in the form of a flat member having a tapered or pointed leading end 43 for spreading insertion between the elements 40 of the female portion. The male member may be provided with integral transverse projections 44 (see FIGS. 7 to 9) for cooperating with the lips 42 of the stationary portion to provide the rivet insertion limiting abutment or it may be formed without insertion limiting means (see FIG. 6).

While friction or pressure alone may be relied upon for retaining the male portion 38 of the rivet 36 in spread engagement with the female portion (see FIG. 10), in the illustrated and preferred form of this construction the edges of the male portion are serrated, as at 45, for engaging the bases of the U-shaped elements 40.

The two part blind rivet 36, when assembled, is operated for securing apertured members 22 together in substantially the same manner as was described in connection with the unitary blind rivet of FIGS. 1 to 5, the movable portion being longitudinally moved in the sleeve to spread the elements 40 by the application of pressure against its outer end.

In FIGS. 11 and 12 a two part blind rivet 46 is shown, which is substantially similar to the rivet 36 of FIGS. 6 through 10. In this construction, however, the stationary portion 37 comprises the male portion and the movable portion 38 comprises the female portion. The female portion 38, which is a flat member having the transverse projections 44 and serrations 45, is slotted in its leading end, as at 47, to provide spaced elements 48 adapted to be spread into engagement with an underside of a panel. The slot 47 is preferably tapered outwardly, as shown at 49, to provide a camming surface to facilitate spreading of the elements when the movable female portion is moved longitudinally inwardly of the U-shaped sleeve or stationary portion 37, so that the uninterrupted leading end or base 50 of the sleeve engages between the elements. In this construction, when the elements 48 of the female portion are spread by their engagement with the base 50 of the male portion, the serrations 45 bite into the edge of the aperture 21, as shown at 51, for preventing accidental displacement of the rivet.

In FIGS. 13 to 15, three modifications of the blind rivet 46 are shown. In FIGS. 13 and 15 the movable female portion 38 is formed with an outwardly projecting integral eyelet construction 52 and in FIG. 14 the portion 38 is projected outwardly of the stationary portion 37 to provide an integral hook 53.

Thus, among others, the several objects and advantages of the invention as aforenoted are achieved. Obviously numerous changes in the structure may be resorted to without departing from the spirit of the invention as defined by the claims.

I claim:

1. A blind rivet for insertion in a hole through a panel, said rivet comprising an elongate flat malleable strip having tapered free ends and being formed with a medial longitudinal slot therein, said strip being folded back upon itself around an imaginary transverse centerline extending through said slot for forming a substantially U-shaped sleeve wherein the base of the U-shaped sleeve forms a self-supporting substantially rigid inner end for insertion through the hole in the panel, said sleeve providing an elongate cavity of rectangular cross-section in which the arms of said U-shaped sleeve form spaced substantially flat parallel walls of said cavity, said slot defining spaced elements at the inner end of the sleeve adapted to be forcibly spread into engagement with the underside of the panel, the free ends of the strip being folded to project outwardly of the sleeve in opposite directions for forming an insertion limiting shoulder for the rivet and then being bent inwardly upwardly into engagement for forming the rivet head and then being folded to extend in juxtaposed relation downwardly into the cavity with the tapered free ends directed toward said slot for forming an element spreading member of rectangular cross-section and having flat surfaces engageable throughout substantially their entire length with said flat walls of said cavity, whereby, on inserting the sleeve through the hole and applying pressure to the rivet head for moving the spreading member longitudinally inwardly in the cavity toward the leading end of the sleeve, the tapered free ends of the spreading member enter the slot between said elements and forcibly spread the latter into engagement with the underside of the panel while said walls of said cavity support said spreading member against buckling in a direction transverse to the plane thereof.

2. A blind rivet for insertion in a hole through a panel, said rivet comprising an elongate flat malleable strip having tapered free ends folded substantially back upon itself around an imaginary transverse centerline substantially equidistantly disposed between said free ends for forming a substantially U-shaped sleeve wherein the base of the U-shaped sleeve forms a self-supporting substantially rigid leading end for insertion through the hole in the panel, said sleeve providing an elongate cavity of rectangular cross-section in which the arms of said U-shaped sleeve form spaced substantially flat parallel walls of said cavity, said leading end of said sleeve being slit in a direction transverse to said imaginary centerline for defining spaced independent elements at the leading end of the sleeve adapted to be forcibly spread into engagement with the underside of the panel, the free ends of the strip being folded to project outwardly of the sleeve in opposite directions for forming an insertion limiting shoulder for the rivet and then being bent inwardly, upwardly into engagement for forming the rivet head and then being folded to extend in juxtaposed relation downwardly into the cavity with the tapered free ends directed toward said slit for forming an elongate spreading member of rectangular cross-section and having flat surfaces engageable throughout substantially their entire length with said flat walls of said cavity, whereby, on inserting the sleeve through the hole and applying pressure to the rivet head for moving the spreading member longitudinally, inwardly in the cavity toward the leading end of the sleeve, the tapered free ends of the spreading member enter the slit between said elements and forcibly spread the latter into engagement with the underside of the panel while said walls of said cavity support said spreading member against buckling in a direction transverse to the plane thereof.

3. A unitary blind rivet including a stationary portion and cooperable movable portion for retained insertion in a hole through a panel, said rivet comprising an elongate flat malleable strip having free ends folded substantially back upon itself around an imaginary transverse centerline substantially equidistantly disposed between said free ends for providing a substantially U-shaped sleeve forming said stationary portion of said rivet, the base of said U-shaped sleeve forming a self-supporting substantially rigid leading end for said stationary portion to facilitate insertion thereof through the hole in the panel and said sleeve defining an elongate cavity of rectangular cross-section in said stationary portion in which the arms of said U-shaped sleeve form spaced substantially flat parallel walls of said cavity, said free ends of the strip being folded to project outwardly of the sleeve in opposite directions for forming an insertion limiting shoulder for said stationary portion of said rivet and then being bent inwardly, upwardly into engagement for forming a rivet head and then being folded to extend in juxtaposed relation downwardly into the cavity for forming said movable portion of said rivet, said movable portion being of rectangular cross-section and having flat surfaces engageable throughout substantially their entire length with said flat walls of said cavity, said free ends being directed toward said leading end of said stationary portion and forming the leading end of said movable portion, the leading end of one of said stationary portion or movable portion being formed to define spaced depending elements adapted to be spread into engagement with the underside of said panel by the engagement of the leading end of said other portion therebetween when said movable portion is moved inwardly of said cavity in said stationary portion by the application of pressure against said rivet head in the direction of such movement, said walls of said cavity supporting said movable portion of said rivet against buckling in a direction transverse to the plane thereof when moving pressure is applied thereagainst.

References Cited by the Examiner
UNITED STATES PATENTS

| | | | |
|---|---|---|---|
| 1,006,468 | 10/1911 | DesIsles | 85—26 |
| 1,099,323 | 6/1914 | Szydlowski | 85—26 |
| 1,146,651 | 7/1915 | Raeger | 85—84 |
| 1,559,619 | 11/1925 | Karitzky | 85—85 |
| 2,219,788 | 10/1940 | Pleister | 85—85 |
| 2,328,023 | 8/1943 | Lang | 85—38 |
| 2,333,930 | 11/1943 | Hedstrom | 85—38 |
| 2,711,115 | 6/1955 | Gisondi | 85—23 |
| 2,748,645 | 6/1956 | Peckham et al. | 85—38 |
| 2,779,229 | 1/1957 | Jahn | 85—26 |
| 2,845,832 | 8/1958 | Olson | 85—85 |

CARL W. TOMLIN, *Primary Examiner.*

EDWARD C. ALLEN, *Examiner.*

M. PARSONS, JR., *Assistant Examiner.*